Sept. 13, 1966  V. P. GRIFFIN  3,271,942
APPARATUS FOR THE MAKING OF STRANDS, ROPES, CABLES AND THE LIKE
Filed Jan. 21, 1964  7 Sheets-Sheet 1
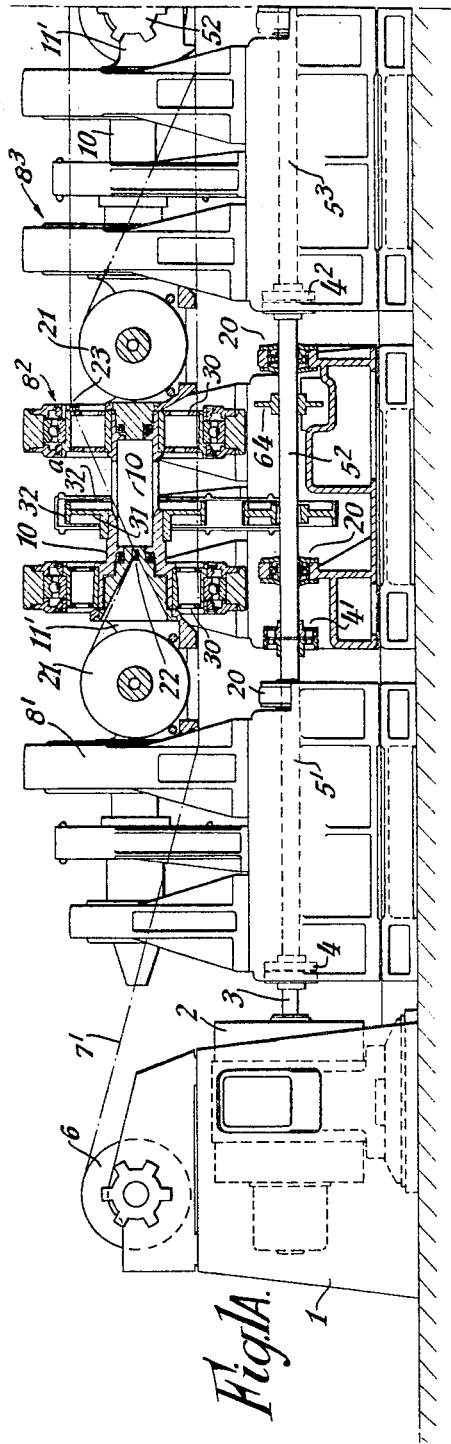
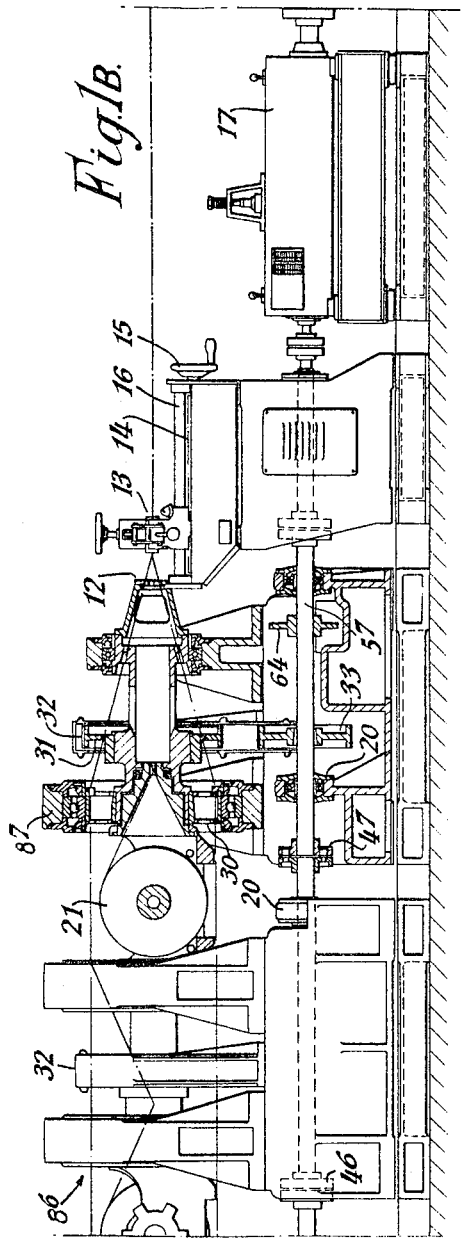
INVENTOR.
VINCENT PATRICK GRIFFIN
BY
Shoemaker and Mattare
ATTORNEYS

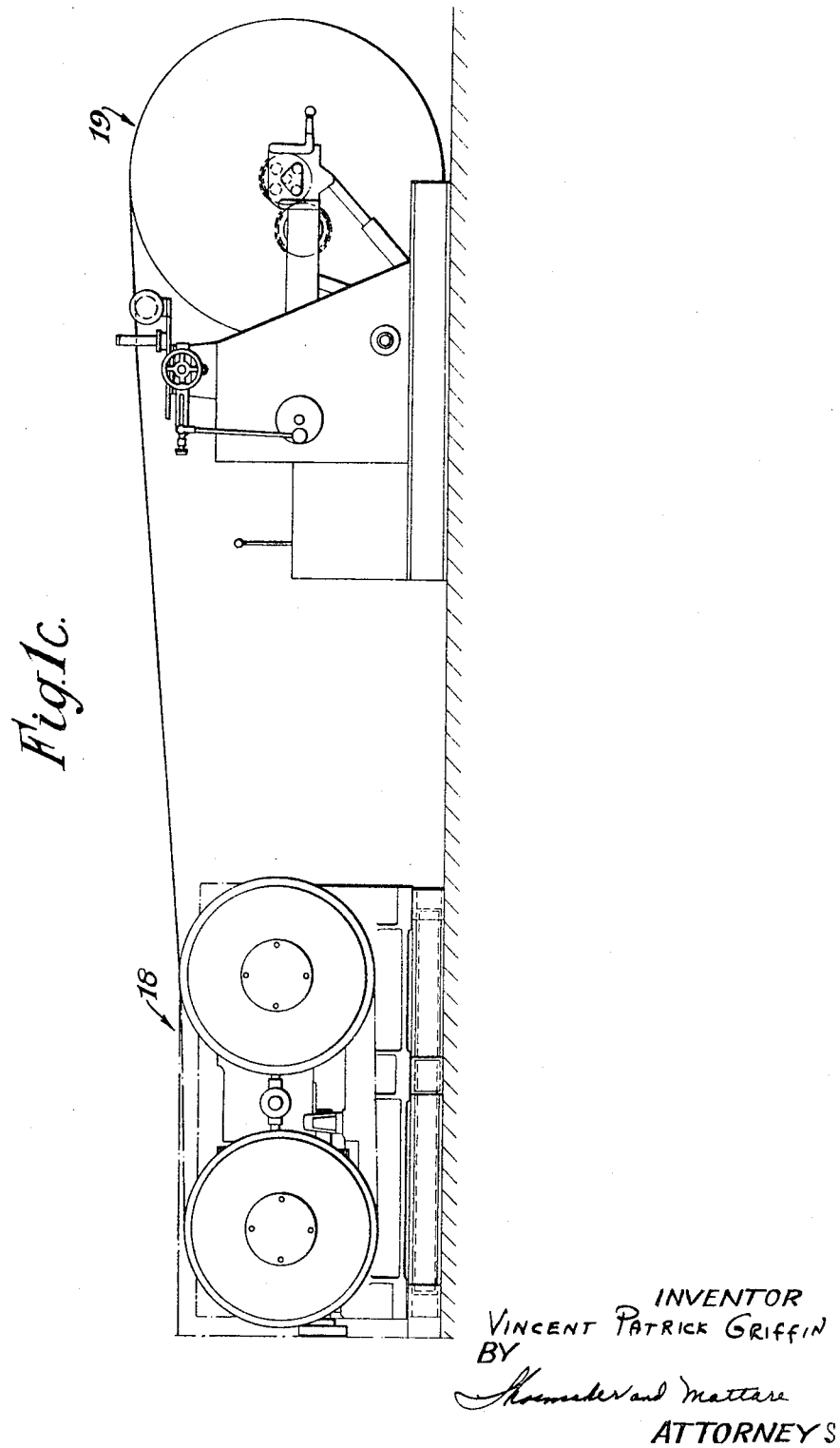

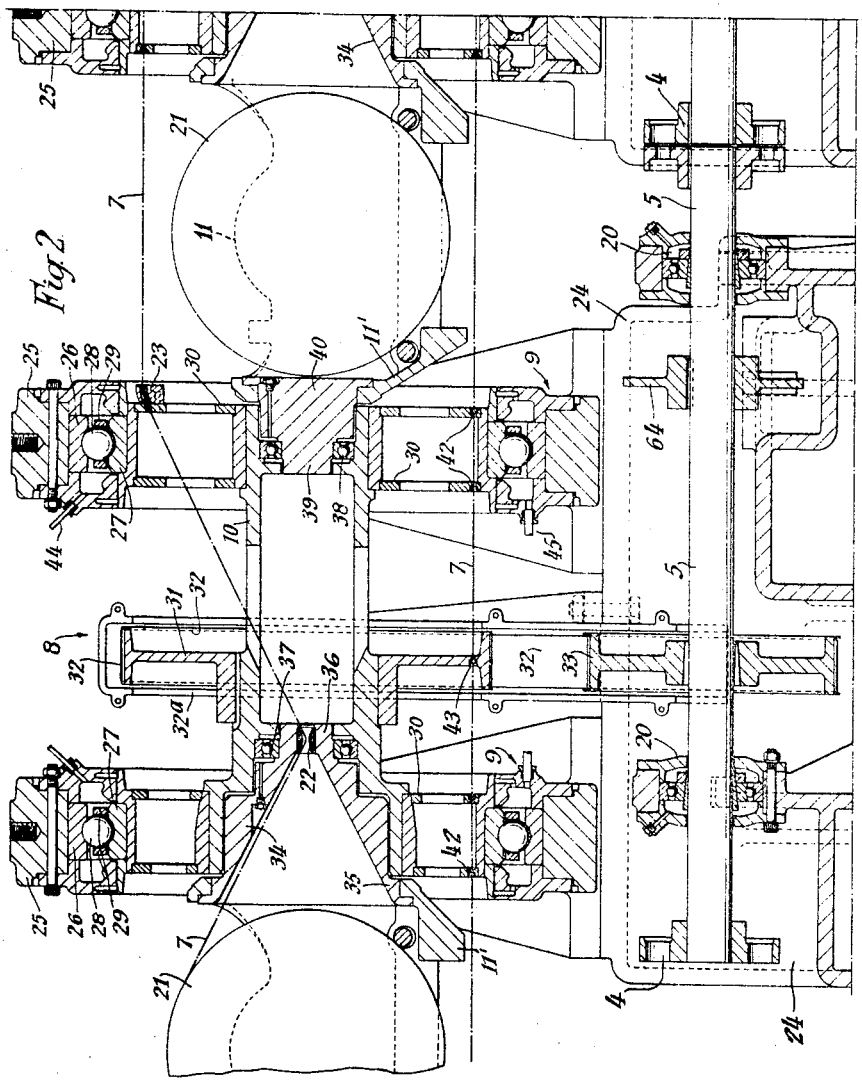

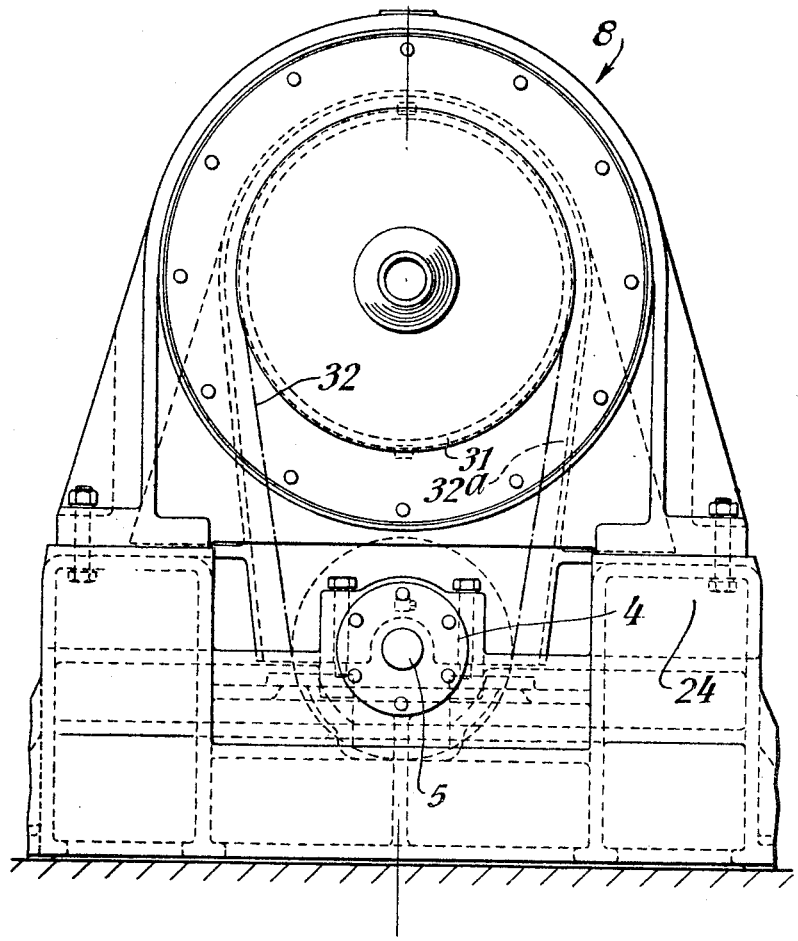

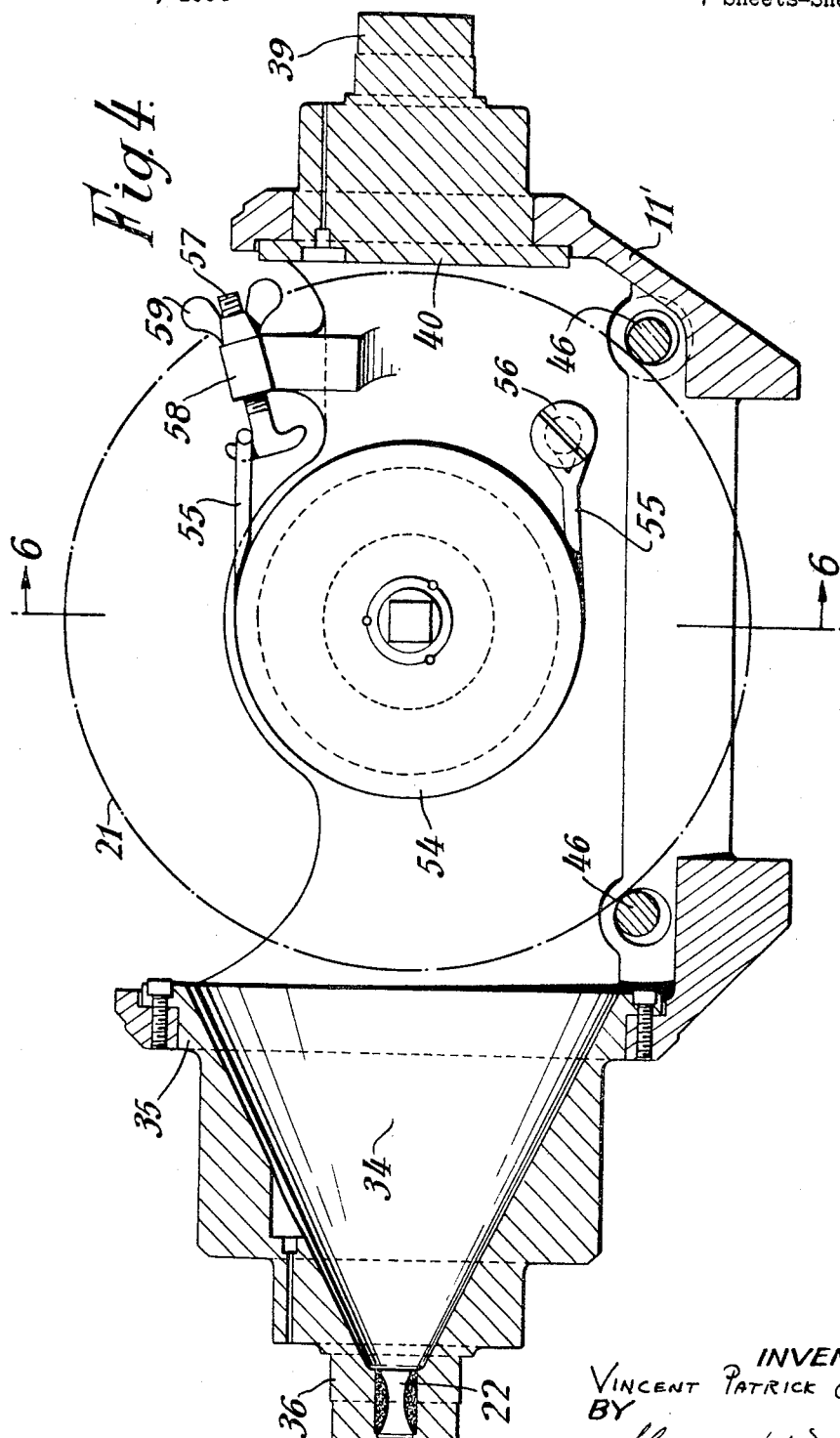

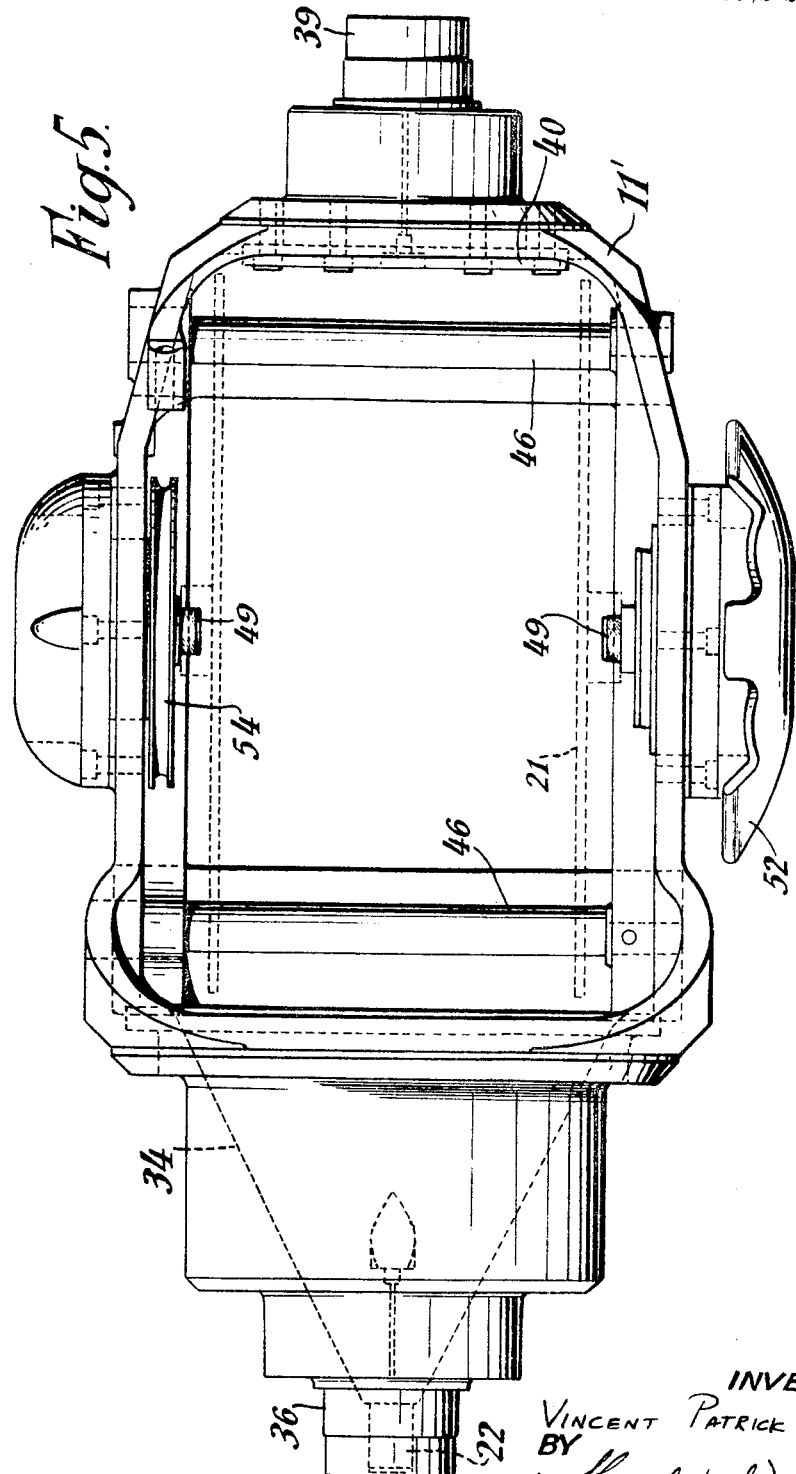

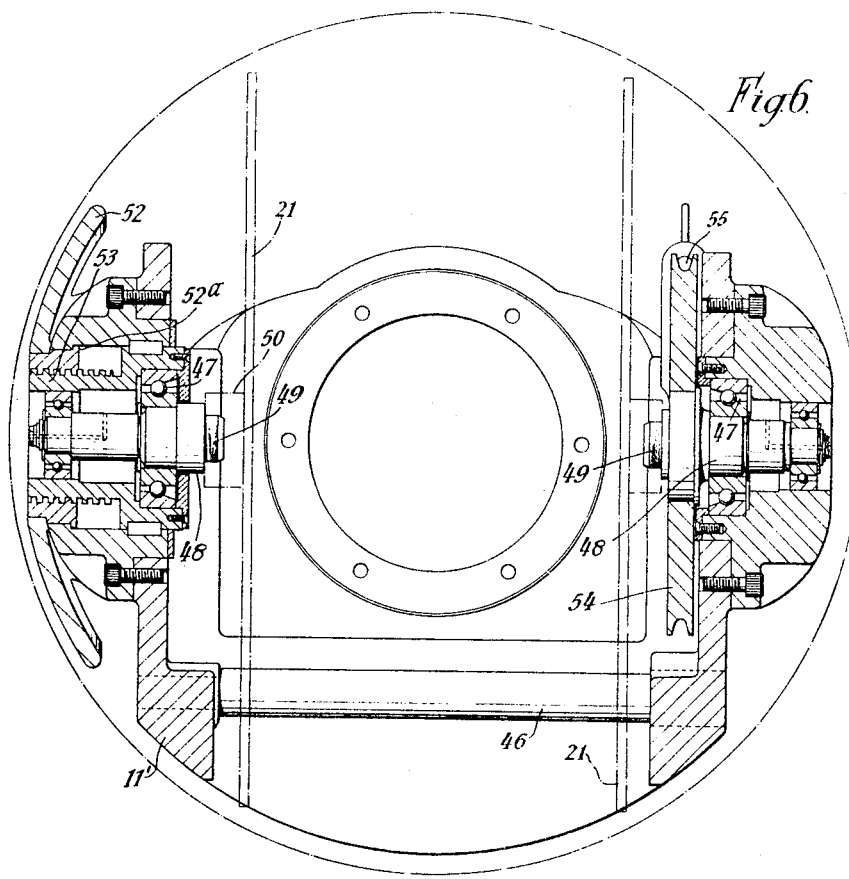

United States Patent Office 3,271,942
Patented Sept. 13, 1966

3,271,942
APPARATUS FOR THE MAKING OF STRANDS, ROPES, CABLES AND THE LIKE
Vincent Patrick Griffin, Ashton-under-Lyne, England, assignor to Olympic Stranding Machinery Limited, Manchester, England
Filed Jan. 21, 1964, Ser. No. 339,231
Claims priority, application Great Britain, Jan. 26, 1963, 3,339/63; May 16, 1963, 19,562/63
9 Claims. (Cl. 57—58.32)

This invention is concerned with a machine for the making of strand, ropes, cables, and the like. The more common use of the invention will be in the making of strands and cables from metal wire, for example steel wire in the case of rope strands, and copper or aluminum wire in the case of stranded electric cables, but the invention is useful also for the making of softer strands and ropes such as those of hemp, sisal, manila, nylon and the like.

For convenience of description the machine the subject of this invention will be referred to as a stranding machine but it is to be understood that it may be used not only for stranding as such but also for what are known as closing operations in rope-making, and laying-up operations in cable making, and also for bunching operations, all these terms being well known and understood in the art.

It has previously been proposed to provide a wire stranding or laying machine having a series of individual heads mounted on a common longitudinal frame, each head having a rotor section and a drive section, the rotor section supporting in cantilever fashion a cradle on which is mounted a wire supply spool or bobbin. The drive sections of the various heads are coupled together and they are driven in synchronism from a common prime mover. The rotor section of each head consists of a tubular head mounted in two axially-spaced encircling bearings and carries means at the centre and at the periphery for guiding a wire from the spool through the machine in a straight line path. Co-operating magnetic means are provided for ensuring that the cradle does not rotate as the rotor rotates. This magnetic means is constituted by two permanent magnets one on the cradle and one on the frame within which the rotor is rotatable, the wire from the spools passing between the two permanent magnets of the succeeding head.

This proposed machine is disadvantageous in that it cannot be run at much higher speeds than the well-known planetary type and tubular type stranding machines, and this is not sufficient under modern production conditions. It is also considered that the provision of the magnetic means in this proposed machine renders same impractical since it is felt that the magnetic means interferes with the passage of the wires through the machine.

It is an object of the present invention to provide a stranding machine which can be run at least twice the speed of existing stranding machine with consequent increase in the production of wire.

This high-speed running is achieved by providing a series of wholly separate, independent heads, each with a special rotor construction for supporting cradles for carrying the wire supply bobbins, and each with its own combined driving and braking section.

The present invention is, therefore, a stranding machine incorporating a series of separate, independent and co-axially aligned heads, each head including an upper rotating carrier section and a lower drive shaft section, cradles for the wire-supply bobbins supported between the rotating carrier sections of adjacent heads, each rotating carrier section consisting of a tubular rotor having large-diameter ends, and axially-spaced, large-diameter encircling bearings in the head for mounting said large-diameter ends, the diameter of the bearings being such that they permit free passage of the wires from individual bobbins in the cradles between adjacent carriers, and each drive shaft section comprising a drive shaft, an endless drive connecting the drive shaft to the corresponding rotor, coupling means at each drive shaft end for connecting same to adjacent drive shafts so that the drive shafts are rotated synchronously, and a brake on the drive shaft so that both driving and braking forces can be transmitted to the rotating carrier section of each head from the drive shaft section of each head, and wire guide means on the rotor and large-diameter ends of each rotating carrier section to constrain wire fed from the wire supply bobbin of each cradle to follow a straight-line path disposed axially of the machine.

It is an advantage of the invention that because the bearings for supporting the cradle ends in the rotating carrier sections may be self-aligning bearings (though this is not essential) it is not necessary that there should be exact axial alignment of the several heads arranged along the length of the machine. This makes the erection and maintenance of the machine very much more easy than has been the case with a tubular machine where exact alignment along the tube is a serious necessity.

When contra-laying is to be carried out, an intermediate twist plate and former will be introduced at the appropriate point or points along the machine, with or without an adjacent hauling-off means if required. In such cases also a reversing means will be included in the synchronised drive or drives to the carrier or carrier sections which is or are to effect the contra-laying.

The synchronous rotation of the several rotating carrier sections may be obtained in any suitable way, for example by a drive to each from a common drive shaft, this drive conveniently being of the so-called timing belt type; or there may be a gear drive or a chain drive from a common shaft to each carrier, or a series of synchronous electric motors may be provided, namely one motor for each head, or other forms of synchronised drive may be provided. The drives to the heads (or to some only of them) may include clutch means so that any number of consecutive heads less than the maximum may be driven, according to the number of wires to be stranded.

The bearings employed to support the rotating carrier sections, will usually include means for taking the axial thrust resulting from the pulling of the wires through the machine at the delivery end. Any suitable type of bearing may be employed, for example ball, roller, plain or air bearings or the like may be used.

In the preferred arrangement each head has two large diameter bearings, one at each end, the rotating carrier section has a tubular rotor or centre and a flange-like part at each end, these flange like parts being carried rotatably in the respective bearings and a driving wheel or pulley is carried on said tubular rotor or centre between said flange-like parts.

It is a feature of the improved machine that it may be made to any desired length (according to the number of bobbins required) by being made up of a selected number of heads of a standard construction each incorporating in its design its own rotating carrier section, its own drive shaft section including, its own braking means and a capacity for handling the maximum number of wires to be stranded. The assembly of the complete machine is achieved by the connection of the said drive shaft sections together end to end, say through a required number of flexible couplings. The improved machine may therefore be described as of unit construction, all the bobbin cradles also being identical with each other.

The invention will now be described as embodied in the example illustrated in the accompanying drawings, wherein:

FIGS. 1a, 1b and 1c together being a partial sectional side view of a Stranding Machine, the machine being broken in length so as to avoid too small a scale in the drawing;

FIG. 2 is an axial sectional view through one of the heads of the machine shown in FIG. 1;

FIG. 3 is an end view of the main parts of such head;

FIG. 4 is an axial section through one of the bobbin cradles;

FIG. 5 is a plan of the cradle; and

FIG. 6 is a cross section on the line 6—6 of FIG. 4.

Referring first to the three-part FIG. 1 which shows a general lay-out of the machine, and commencing at the left-hand end of the figure, there is a drumstand or pedestal 1 which has a driving motor 2 the output shaft 3 of which is connected by coupling 4 to the first section $5^1$ of a sectional shaft $5^1$–$5^7$ mentioned below. The said pedestal 1 also carries a pay-out device 6 for a core wire $7^1$. Continuing from the left hand end of the figure, there is then an assembly of individual heads $8^1$–$8^7$ each of which (except the first $8^1$ and the last $8^7$) includes two large-diameter bearings 9 carrying a rotating carrier or stranding section 10 described in more detail below. Each end of the carrier 10 supports one end of a cradle 11 as also is described below, there being provision for relative rotation between the parts 10 and 11. The endmost rotating carriers carry only one end of a cradle 11. In the complete machine represented by the broken FIG. 1 there would be, in addition to the half-head $8^1$ at the left-hand end, five complete heads $8^2$–$8^6$, and a second half-head $8^7$ at the right-hand end. The number of heads 8 in the machine is not critical, and will depend upon the maximum number of wires which the machine is intended to strand together. In this connection, a machine having a large number of heads 8 could be run with only some of them operating if the number of wires to be stranded at any one time were less than the number of heads in the machine. After the half-head $8^7$ at the outlet end of the machine there is a twist plate 12 of known kind, carried by the endmost rotating member 10 and after this there is a setting device 13, also of known kind, which is adjustable towards and away from the plate 12 by means of a screw 14 and a hand wheel 15, the device 13 being slidably mounted on the guide rod 16. Beyond the device 13 there is a variable speed gear box 17, a capstan device 18 of known kind, and the final take-up mechanism 19, also of known kind.

Each head $8^1$–$8^7$ has, therefore, an upper rotating carrier section 10, and a lower drive shaft section $5^1$–$5^7$.

The sectional shaft $5^1$–$5^7$ has its sections connected together by couplings $4^1$–$4^7$ there being one section of The sectional shaft $5^1$–$5^7$ has its sections connected together by couplings $4^1$–$4^7$ there being one section of shaft for each head 8, and the rotary member 10 of each head is driven from the respective shaft section 5 in such a way that there is perfect synchronism in the rotation of the several rotary members 10. The shaft sections are mounted in bearings 20. There may be disengagable clutch means in the drive from any shaft section 5 to the respective rotary member 10 so that selected heads may be put out of use. There may also be reversing means in any or all the transmissions between the shaft sections 5 and the various members 10 so that, if desired, stranding or overlaying may be carried out in opposite directions. As is more fully described below, each cradle 11 carries a bobbin 21 for a supply of wire. The wire from each bobbin is fed through a guide 22 in the outlet end of the cradle 11 in which the bobbin is carried and the wire then passes from such guide 22 to a further guide 23 at the perimeter of the rotary carrier 10 immediately in front of it. This last-mentioned guide 23 is in line with guides 42 in all the carriers 10 in front of it and the wire may thus continue through the assembly of heads without any deviation from a straight path whilst rotating around the axis of the machine. The several wires $7^1$–$7^7$ are twisted at the twist plate 12, set in the setting device 13 and then taken up in the normal way by the capstan 18.

Referring now to FIGURES 2 and 3, each head 8 comprises a box-like base 24 having two inverted stirrup shaped brackets 25, in which are secured large diameter bearings indicated generally at 9 for the rotors 10. In the base frames 24 are bearings 20 for the respective shaft sections $5^1$–$5^7$ coupling units 4 being arranged at the ends of the respective shaft sections, the two parts of the couplings 4 being one inside the base 24 (at the left-hand end) and the other outside the frame 24.

Each of the rotors 10 consists of a tubular rotor and is formed at one end with an enlarged diameter. Shoulders are provided at the large and small ends of the tubular carrier 10 to locate hollow ring elements or flanges 30 which are spaced axially apart to correspond to the spacing of the brackets 25. The large diameter bearings 9 each comprise inner and outer races 26, 27, balls 28 and a ball cage 29, the inner race 27 being carried by the hollow ring 30 and the outer race 26 by the stirrup bracket 25.

Drive is imparted to the rotors of the rotating carrier sections 10 from their associated drive shaft sections 5, by means of a pinion 33 fast on shaft section 5 through a timing belt 32 to a driving wheel 31 keyed to the carrier 10 at a central position thereon.

The belt drive and the wheel 31 and pinion 33 are enclosed in a guard casing 32a and provision is made for arresting rotation of each rotary carrier 10 by means of a disc brake assembly of a known kind (not illustrated) and including a brake disc 64 fast on the shaft section 5. The disc brake assemblies are operated simultaneously in well-known manner to arrest movement of the stranding machine, instantaneous stoppage of the machine being assured by the application of individual braking forces to each rotating carrier section.

As is clearly shown in FIGURE 1a and 2, the cradles 11 extend between the several heads 8, the ends of the cradles being supported in bearings in the ends of the rotors in each pair of adjacent heads 8 to permit of relative rotation. Each cradle 11 comprises a central casting 11', the ends of which are machined to receive spigot members 35, 40 the spigot member 40 having a shouldered end 39 of reduced diameter forming a trunnion which is supported or spigotted within a ballbearing 38 provided in the narrow end of the rotor 10. The other spigot member 35 is similarly formed with a trunnion 36, which is mounted or spigotted in a ballbearing 37 in the enlarged end 10' of the rotor in the next head in the series.

Each cradle 11 carries a bobbin 21 for a supply of wire. In order to accommodate the wire 21 as it is drawn off, the bobbin the spigot member 35 has a conical recess 34 which terminates in a guide thimble 22 of ceramic, sintered or like wear resistant material. From the guide 22, the wire passes to a further guide 23 at the perimeter of the rotary carrier 10. It will be seen that each of the hollow rings 30 beyond the first head 8 is formed with an identical number of guide openings 42 and that the driving wheels 31 have corresponding guide openings 43 in radial alignment with the openings 42 to enable the several wires $7^1$–$7^7$ which are to be stranded together to pass through the respective heads without any deviation from a straight path while rotating around the axis of the machine. The wires $7^1$–$7^7$ are twisted together in passage through the twist plate 12 set in the setting device 13 and then taken up in the normal way by the capstan 18.

In a machine for stranding a maximum of 7 wires together, the guide openings 42 and 43 would be arranged at suitable points around the axis of the machine, usually not equally spaced so as, in known manner, allowing the full and empty bobbins to be passed between them. Such points could be, for example, three at the 12-o'clock position, three more at the 6-o'clock position and a seventh, in the twist plate being at the centre for a core wire. This spacing of wires is well known in the stranding art.

Thus the hollow ring 30 in the first head $8^1$ has only one wire passing through it, the ring 30 in the next head $8^2$ has two wires passing through it, the next one three wires and so on, each cradle 11 furnishing its wire to another of the openings 42 in the rotating rings 30 of the succeeding heads so that, if the machine is fully in use, at the end of the assembly there is a wire passing through each one of the openings 42 in the hollow ring 30.

The bearings 9 are adapted to be run under pressurised lubrication, there being oil inlet conduits 44 at the top of the bearing and oil outlet connections 45 at the bottom of the bearing. As will appear from FIG. 3 the sectional shaft 5 is vertically below the axis of the machine.

Referring now to FIGS. 4, 5 and 6 the cradle 11 is shown in detail. This comprises a main casting 11 the ends of which are machined to receive the respective spigots 35 and 40. Each cradle is provided with ball bearings 47 for short spindles 48 the inner ends 49 of which may be squired and adapted to enter corresponding openings in bosses 50 and the sides of the bobbin 21 for the wire. For releasing a bobbin when empty, a hand wheel 52 is rotated on the screwed end 53 of a bush carrying the spindle 48 so as to withdraw the end 49 from the boss 50 on the side of the bobbin, sufficiently far to allow for the bobbin to be taken off the end of the spindle 48 at the other side of the cradle. The handwheel 52 is restrained against axial movement by the lip 52a. If the end 49 of spindle 48 is not squared but is round a driving peg will be mounted on pulley 54 to enter a hole in the adjacent flange of bobbin 21, in known manner.

At the opposite side of the cradle from the handwheel 52 the spindle 48 carries a pulley 54 serving as a brake drum for a cable 55 one end of which is fastened to the cradle at 56, and the other end of which hooks on to the inner end of an adjustment screw 57 mounted in a bracket or nut 58 on the cradle 11. By rotating the nut 59 the cable 55 can be adjusted in tension sufficiently to prevent over-running of the cable bobbin under the tension of the drawn-off wire.

Referring back to FIG. 1 it will be seen that each wire 7 after leaving its bobbin and having passed through the guides 22 and 23 in the rotating carrier section 10 immediately ahead of such bobbin, continues in a straight line to the last head $8^7$ and, although rotating or gyrating for stranding purposes it is not subjected to bowing nor to any drawing action or the like. Because of this, the machine may be run at very much higher speeds than has been possible with the machine known hitherto. Each wire gyrates in a single bow, the bows of the respective wires being progressively shorter and all terminating at the setting device 13.

An advantage of this invention lies in the fact that each head in the machine is unaffected by any stresses in the other heads. Also, each head being relatively small it is easily balanced, and the machine is much less likely to come out of order than those at present known. Further, as the heads are separately driven and their total mass is less than the mass of a tube carrying the same number of bobbins, much higher rotational speeds are possible and these in turn allow a faster hauling off of the finished product. It is an incidental advantage of the machine that it is much quieter than known machines.

I claim:

1. A stranding machine incorporating a series of separate, independent and co-axially aligned heads, each head including an upper rotating carrier section and a lower drive shaft section, cradles supporting the wire-supply bobbins between the rotating carrier sections of adjacent heads, each rotating carrier section consisting of a tubular rotor having large-diameter ends, and axially-spaced, large-diameter encircling bearings in the associated head for mounting said large-diameter ends, the diameter of the bearings being such that they permit free passage of the wires from individual bobbins in the cradles between adjacent carriers, and each drive shaft section comprising a drive shaft, an endless drive connecting the drive shaft to the corresponding rotor, coupling means at each drive shaft end for connecting same to adjacent drive shafts so that the drive shafts are rotated synchronously, and a brake on each drive shaft section so that both driving and braking forces can be transmitted to the rotating carrier section of each head from the drive shaft section of each head, first wire guide means on the cradle and second wire guide means on the large-diameter ends of each rotating carrier section to constrain wire fed from the wire supply bobbin of each cradle to follow a straight-line path disposed parallel to the axis of the machine.

2. A stranding machine as claimed in claim 1, wherein the rotating carrier section of each intermediate head carries rotatably in the tubular rotor the ends of two floating cradles for bobbins, one behind and one in front of the head.

3. A stranding machine as claimed in claim 1, in which the first wire guide means comprises a guide at the axis of rotation of the tubular rotor of each head, and the second guide means comprising a guide in or near the periphery of the large-diameter ends of the tubular rotor, said second guide means on all of the heads being in alignment.

4. A machine as claimed in claim 1, in which the endless drive from each drive shaft to the rotor is a timing belt.

5. A machine as claimed in claim 1, in which all said intermediate heads are of identical, interchangeable construction.

6. A machine as claimed in claim 1, in which the rotating carrier section of each head has two large-diameter bearings, one at each end, while the rotor has a tubular centre and a flange-like part of larger diameter than the centre at each end of such centre, these flange-like parts being carried rotatably in respective bearings, and a driving wheel or pulley being carried on said tubular centre between said flange-like parts.

7. A machine as claimed in claim 1, in which the brake on each drive shaft is of the disc type.

8. A machine as claimed in claim 1, in which each head comprises a box-like base, a pair of axially-spaced, inverted stirrup-shaped brackets mounted on the base and extending upwardly therefrom, said drive shaft longitudinally traversing and rotatably supported in the base, a coupling at each end of said drive shaft, said large-diameter encircling bearing each being mounted in one of said pair of stirrup-shaped bracket, said tubular rotor having the two large-diameter ends supported by the brackets with its ends rotatably carried in the encircling bearings, a pinion on the rotor, a pinion on the drive shaft, a timing belt drivingly interconnecting the pinions, each said brake being a disc brake operatively connected to a drive shaft section.

9. A machine as claimed in claim 8, in which each end of the tubular rotor is of socketed construction to receive the end of a cradle, a bearing being interposed between the walls of the rotor sockets and the cradle ends.

References Cited by the Examiner

UNITED STATES PATENTS

| | | | |
|---|---|---|---|
| 1,218,009 | 3/1917 | Somerville | 57—58.34 X |
| 2,671,303 | 3/1954 | Pearce | 57—58.30 X |
| 2,717,485 | 9/1955 | Pearce | 57—58.32 |

MERVIN STEIN, *Primary Examiner.*

FRANK J. COHEN, D. E. WATKINS,
*Assistant Examiners.*